United States Patent
Weinberg Harel et al.

(10) Patent No.: US 11,714,814 B2
(45) Date of Patent: Aug. 1, 2023

(54) OPTIMIZATION OF AN AUTOMATION SETTING THROUGH SELECTIVE FEEDBACK

(71) Applicant: MICROSOFT TECHNOLOGY LICENSING, LLC, Redmond, WA (US)

(72) Inventors: Shira Weinberg Harel, Herzliya (IL); Uri Zevulun, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/124,953

(22) Filed: Dec. 17, 2020

(65) Prior Publication Data
US 2021/0127152 A1   Apr. 29, 2021

Related U.S. Application Data

(62) Division of application No. 16/213,759, filed on Dec. 7, 2018, now Pat. No. 10,911,807.
(Continued)

(51) Int. Cl.
*G06F 16/2457* (2019.01)
*G06N 20/00* (2019.01)
(Continued)

(52) U.S. Cl.
CPC ....... *G06F 16/24575* (2019.01); *G05B 15/02* (2013.01); *G06F 16/24578* (2019.01);
(Continued)

(58) Field of Classification Search
CPC ............ G05B 15/02; G05B 2219/2642; G06F 3/0484; G06F 16/24569; G06F 16/2457; G06F 16/24573; G06F 15/4578; G06F 16/9535; G06F 16/9536; G06F 16/9538; G06K 9/6263; G06N 5/022; G06N 20/00;
(Continued)

(56) References Cited

U.S. PATENT DOCUMENTS 9,152,953 B2 * 10/2015 Lai .................. G06Q 10/107
9,256,862 B2 *  2/2016 Lai .................. G06Q 10/107
(Continued)

FOREIGN PATENT DOCUMENTS

WO    WO-2019143445 A3 * 10/2019 ............. G05B 15/02

OTHER PUBLICATIONS

"Office Action Issued in European Patent Application No. 18842688.6", dated Mar. 3, 2022, 7 Pages.

*Primary Examiner* — Crystal J Barnes-Bullock
(74) *Attorney, Agent, or Firm* — Shook, Hardy & Bacon, LLP

(57) ABSTRACT

The technology described herein solicits user feedback in order to improve the processing of contextual signal data to identify automation setting preferences. Users have limited availability or willingness to provide explicit feedback. The technology calculates an impact score that measures a possible improvement to the automation system that could result from receiving feedback. Feedback is solicited when the impact score exceeds a threshold. Other rules can be provided in conjunction with the impact score to determine when feedback is solicited, such as a daily cap on feedback solicitations.

20 Claims, 9 Drawing Sheets

Related U.S. Application Data

(60) Provisional application No. 62/619,201, filed on Jan. 19, 2018.

(51) Int. Cl.

| | | |
|---|---|---|
| *G06F 16/9535* | (2019.01) | |
| *G06F 16/9536* | (2019.01) | |
| *H04L 12/28* | (2006.01) | |
| *H04L 51/063* | (2022.01) | |
| *H04N 21/25* | (2011.01) | |
| *H04N 21/258* | (2011.01) | |
| *H04N 21/45* | (2011.01) | |
| *G06F 18/21* | (2023.01) | |
| *G05B 15/02* | (2006.01) | |

(52) U.S. Cl.
CPC ...... *G06F 16/9535* (2019.01); *G06F 16/9536* (2019.01); *G06F 18/2178* (2023.01); *G06N 20/00* (2019.01); *H04L 12/2829* (2013.01); *H04L 51/063* (2013.01); *H04N 21/252* (2013.01); *H04N 21/25891* (2013.01); *H04N 21/4532* (2013.01)

(58) Field of Classification Search
CPC ............ G06Q 30/0251; G06Q 30/0269; H04L 12/2829; H04L 51/063; H04N 21/252; H04N 21/25875; H04N 21/25891; H04N 21/4532
See application file for complete search history.

(56) References Cited

U.S. PATENT DOCUMENTS

| | | | | |
|---|---|---|---|---|
| 10,223,742 | B2 * | 3/2019 | Arora | G06F 16/24578 |
| 10,474,961 | B2 * | 11/2019 | Brigham | G06N 20/00 |
| 10,530,720 | B2 * | 1/2020 | Vardhan | H04L 63/0428 |
| 10,593,118 | B2 * | 3/2020 | Bostick | G06F 8/30 |
| 10,878,510 | B2 * | 12/2020 | Perl | B60W 40/00 |
| 10,878,807 | B2 * | 12/2020 | Tomar | G06N 3/0445 |
| 11,127,048 | B2 * | 9/2021 | Publicover | G06F 16/2358 |
| 2019/0042988 | A1 * | 2/2019 | Brown | G06N 5/022 |
| 2020/0118152 | A1 * | 4/2020 | Landry | G06F 11/3476 |
| 2020/0394608 | A1 * | 12/2020 | Trim | G06Q 10/08355 |
| 2021/0063179 | A1 * | 3/2021 | Hayes | B60W 40/06 |

\* cited by examiner

OPTIMIZATION OF AN AUTOMATION SETTING THROUGH SELECTIVE FEEDBACK

CROSS-REFERENCE TO RELATED DOCUMENTS

This application is a divisional of prior application Ser. No. 16/213,759, filed Dec. 7, 2018, and titled "OPTIMIZATION OF AN AUTOMATION SETTING THROUGH SELECTIVE FEEDBACK," which claims the benefit of priority to U.S. Provisional Application No. 62/619,201, filed Jan. 19, 2018, and titled "OPTIMIZATION OF AN AUTOMATION SETTING THROUGH SELECTIVE FEEDBACK," the entirety of both applications are hereby incorporated by reference.

BACKGROUND

Computers can adjust automation settings for many devices and systems based on explicitly provided or learned user preferences. For example, automated thermostats can learn a user's preferred room temperature and set the temperature accordingly. Some automation systems consider the preferences of several individual users when determining an automation setting that affects a group of people. It can be extremely difficult to understand a single user's preferences, let alone the preferences of a group of people.

Advanced computer and communication systems have been able to understand user preferences in certain contexts. For example, smart thermostats can learn presence patterns in a home and adjust the temperature on a "just-in-time" basis to increase efficiency. Current technology is able to generate primary patterns that can be used to select the automation settings in a general way. However, at present, the technology has a difficult time understanding when exceptions to the general rule should be applied. For example, a person coming back from a run may wish a room to be cooler than the general pattern indicates. A computing system's failure to anticipate and adapt to exceptions can undermine the efficiency (e.g., energy savings) gains provided by an automation system.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

The technology described herein solicits user feedback in order to improve the processing of contextual signal data to identify automation setting preferences. Users have limited availability or willingness to provide explicit feedback. The technology calculates an impact score that measures a possible improvement to the automation system that could result from receiving feedback. Feedback is solicited when the impact score exceeds a threshold. Other rules can be provided in conjunction with the impact score to determine when feedback is solicited, such as a daily cap on feedback solicitations.

The automation technology described herein manages and optimizes various automation settings based on the preferences of people affected by the settings. For example, the system could automatically set the temperature in a meeting room based on the personal preferences of the meeting attendees, the radio station in a car based on passengers' preferences, the TV channel at a restaurant based on the customers sitting at the bar, etc.

In order to better differentiate a signal that indicates an exception from noise, a feedback mechanism can solicit explicit feedback. Users have limited time to provide feedback and it can be very difficult to determine what type of feedback would provide the most value to the machine-learning (e.g., classifier) system that identifies automation preferences. Some feedback will not significantly improve the classifier, while other feedback could significantly change the setting provided by the system. Aspects selectively solicit feedback that is likely to make the largest performance improvements.

The present system determines when feedback requests should be generated by calculating an impact score for feedback opportunities. When the impact score exceeds a threshold, then a feedback solicitation can be generated. In addition to the impact score, other constraints on feedback can be used. In one aspect, a cumulative limit on feedback solicitations during a time period can be employed. For example, the system may be limited to two feedback solicitations during a day.

The feedback solicitation can be generated in response to a user rejecting a primary preference predicted by the automation system. The feedback solicitation can identify the automation setting, a primary value, a secondary value, and a contextual factor potentially correlated to the secondary value. For example, when a favorite show is suggested, but not selected by the user, the feedback could ask, "Should this TV program (the second choice) have been selected instead of the football highlight show (predicted choice) because Sue is watching TV with you?" The user could provide feedback by selecting yes or no.

DRAWINGS

Aspects of the technology described herein are described in detail below with reference to the attached drawing figures, wherein.

DETAILED DESCRIPTION

Figure 1:
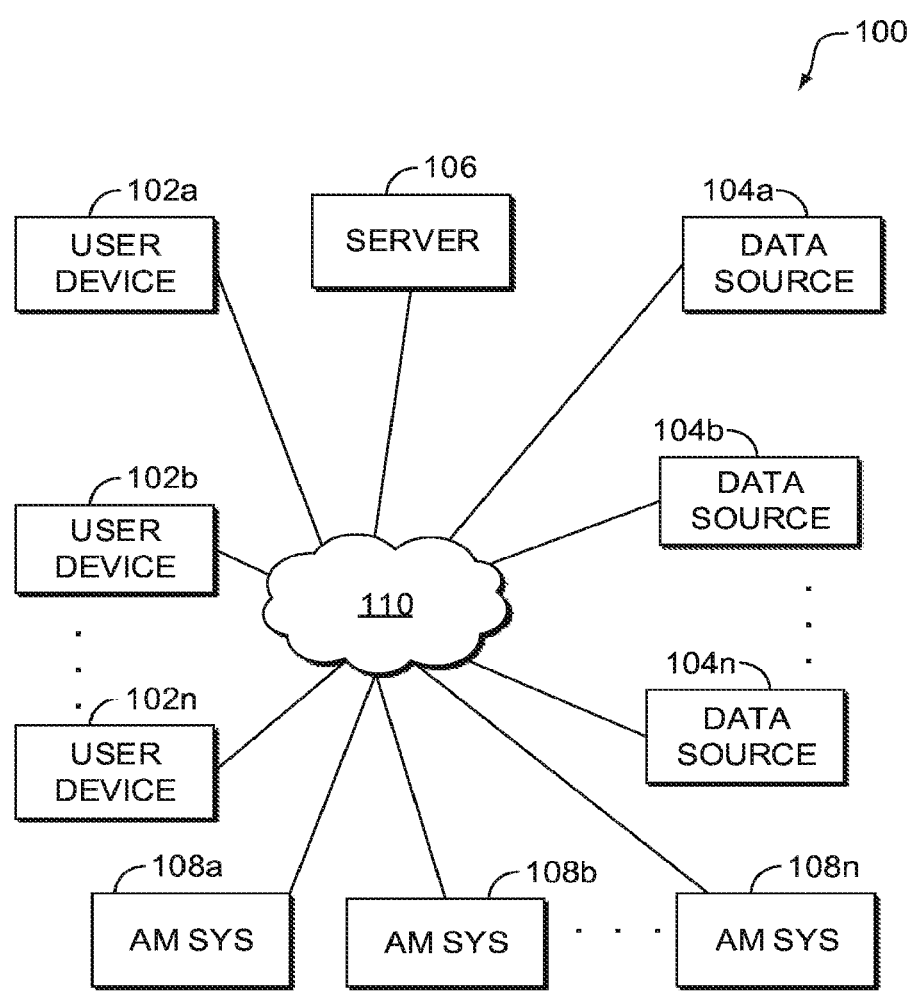
FIG. 1 is a block diagram of an example operating environment suitable for implementing aspects of the technology described herein.

The subject matter of aspects of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein solicits user feedback in order to improve the processing of contextual signal data to identify automation setting preferences. Users have limited availability or willingness to provide explicit feedback. The technology calculates an impact score that measures a possible improvement to the automation system that could result from receiving feedback. Feedback is solicited when the impact score exceeds a threshold. Other rules can be provided in conjunction with the impact score to determine when feedback is solicited, such as a daily cap on feedback solicitations.

The automation technology described herein manages and optimizes various automation settings based on the preferences of people affected by the settings. For example, the system could automatically set the temperature in a meeting room based on the personal preferences of the meeting attendees, the radio station in a car based on passengers preferences, the TV channel at a restaurant based on the customers sitting at the bar, etc.

An automated system controls an environment by adjusting values for automated settings. An automation setting defines a desired system output for a system. A single automated system can have multiple automated settings. For example, automated settings for a thermostat can include a room temperature and fan on/off/automatic. The automation setting value for the room temperature feature could be 74° F. The thermostat measures the room temperature and then calls for heat or cooling from the associated HVAC system to keep the room at 74° F. The system output is controlling room temperature at 74° F.

Aspects of the technology described herein evaluate recent events (context) to determine which automation setting value should be implemented. For example, the preference for a TV viewer at a certain day/time might be a football highlight show. However, in certain contextual settings, such as when a favorite sports team loses, the viewer may prefer a sitcom. In this example, viewing history can form the contextual signals used to identify the primary preference and the secondary preference. However, a challenge is determining whether a single instance, or even a few instances, of a viewer watching a sitcom instead of a favorite sports show constitutes signal noise or a secondary preference. The system can ask for explicit feedback from the viewer to establish the validity of the secondary preference and the validity of the link to the most relevant contextual signal (loss by favorite sports team). For example, the system could ask, "Do you prefer to watch sitcoms instead of sport highlight shows on Sunday night when the Chiefs (an NFL football team) lose?" The response can be used to improve an automation system's future selection.

Differentiating between signal noise and a separate contextual case is difficult. Even a strong preference pattern may have variations that do not constitute an exception. When enough noise is present, then confidence in the primary preference can decrease to the point that an automation system will not take action on the preference. Feedback can be used to differentiate noise from a secondary pattern. Generally, noise is a random variation from a pattern (automation setting plus context) that is not tied to a machine-discernable context change, while a secondary preference is a variation linked to a machine-discernable context change.

In order to better differentiate a signal that indicates an exception from noise, a feedback mechanism can solicit explicit feedback. Users have limited time to provide feedback and it can be very difficult to determine what type of feedback would provide the most value to the machine-learning (e.g., classifier) system that identifies automation preferences. Some feedback will not significantly improve the classifier, while other feedback could significantly change the setting provided by the system. Aspects selectively solicit feedback that is likely to make the largest performance improvements.

The technology described herein determines when feedback requests should be generated by calculating an impact score for feedback opportunities. When the impact score exceeds a threshold, then a feedback solicitation can be generated. In addition to the impact score, other constraints on feedback can be used. In one aspect, a cumulative limit on feedback solicitations during a time period can be employed. For example, the system may limit the system to providing two feedback solicitations during a day.

The feedback solicitation can be generated in response to a user rejecting a primary preference predicted by the automation system. The feedback solicitation can identify the automation setting, a primary value, a secondary value, and a contextual factor potentially correlated to the secondary value. For example, when a favorite show is suggested, but not selected by the user, the feedback could ask, "Should this TV program (the second choice) have been selected instead of the football highlight show (predicted choice) because Sue is watching TV with you?" The user could provide feedback by selecting yes or no.

Some aspects of the technology may be carried out by a personal assistant application or service, which may be implemented as one or more computer applications, services, or routines, such as an app running on a mobile device or in the cloud, as further described herein.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; a number of automation systems, such as automation systems 108a and 108b through 108n; server 106; and network 110. It should be understood that environment 100 shown in FIG. 1 is an example of one suitable operating environment.

Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n can be client devices on the client-side of operating environment 100, while server 106 can be on the server-side of operating environment 100. The user devices can send and receive communications. The communication devices can receive a request to solicit feedback, receive feedback, and communicate the feedback to an automation system 108, server 106, or some other device. The user devices can also be used to control an automation setting, for example, through a smart home application. The user device 102 can be a source of user information, such as a location information (e.g., GPS), calendar information, communication information, and such.

Server 106 can comprise server-side software designed to work in conjunction with client-side software on user devices 102a and 102b through 102n and automation systems 108a and 108b through 108n so as to implement any combination of the features and functionalities discussed in the present disclosure. For example, the server 106 may run an automation engine, such as automation engine 280, which determines the automation system settings for various systems and determines when feedback should be solicited. The server 106 may receive control data and contextual data from the user devices. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. (For example, in one aspect, one or more data sources 104a through 104n provide (or make available for accessing) user data to user-data collection component 214 of FIG. 2.) Data sources 104a and 104b through 104n may be discrete from user devices 102a and 102b through 102n and server 106 or may be incorporated and/or integrated into at least one of those components. In one aspect, one or more of data sources 104a through 104n comprise one or more sensors, which may be integrated into or associated with one or more of the user device(s) 102a, 102b, or 102n, automation systems 108a, 108b, or 108n, or server 106. Examples of sensed user data made available by data sources 104a through 104n are described further in connection to user-data collection component 214 of FIG. 2. The data sources 104a through 104n can comprise a knowledge base that stores information about a venue, a user, a group of users, or other information related to a particular automated setting.

Automation systems 108a and 108b through 108n may comprise any type of computing device capable of automatically controlling a system that produces a real-world output. By way of example, the automation system 108 could be an environmental control system that controls room temperature via an HVAC system, controls lighting, sound level, floor control (e.g., which user device presents on a main screen, which user device controls a primary presentation) in a multi-person meeting, and such. By way of example, the automation system 108 could be an automated hospitality system that orders food and drinks for a meeting in an office setting. The automation system could be an in-car entertainment system that controls, among other aspects, an audio system output (e.g., radio, satellite radio, CD, Bluetooth input, or DVD). The automation system could be an entertainment control system in a bar, restaurant, or other public accommodation that selects entertainment outputs based on interests of people present at the place of accommodation.

Figure 2:
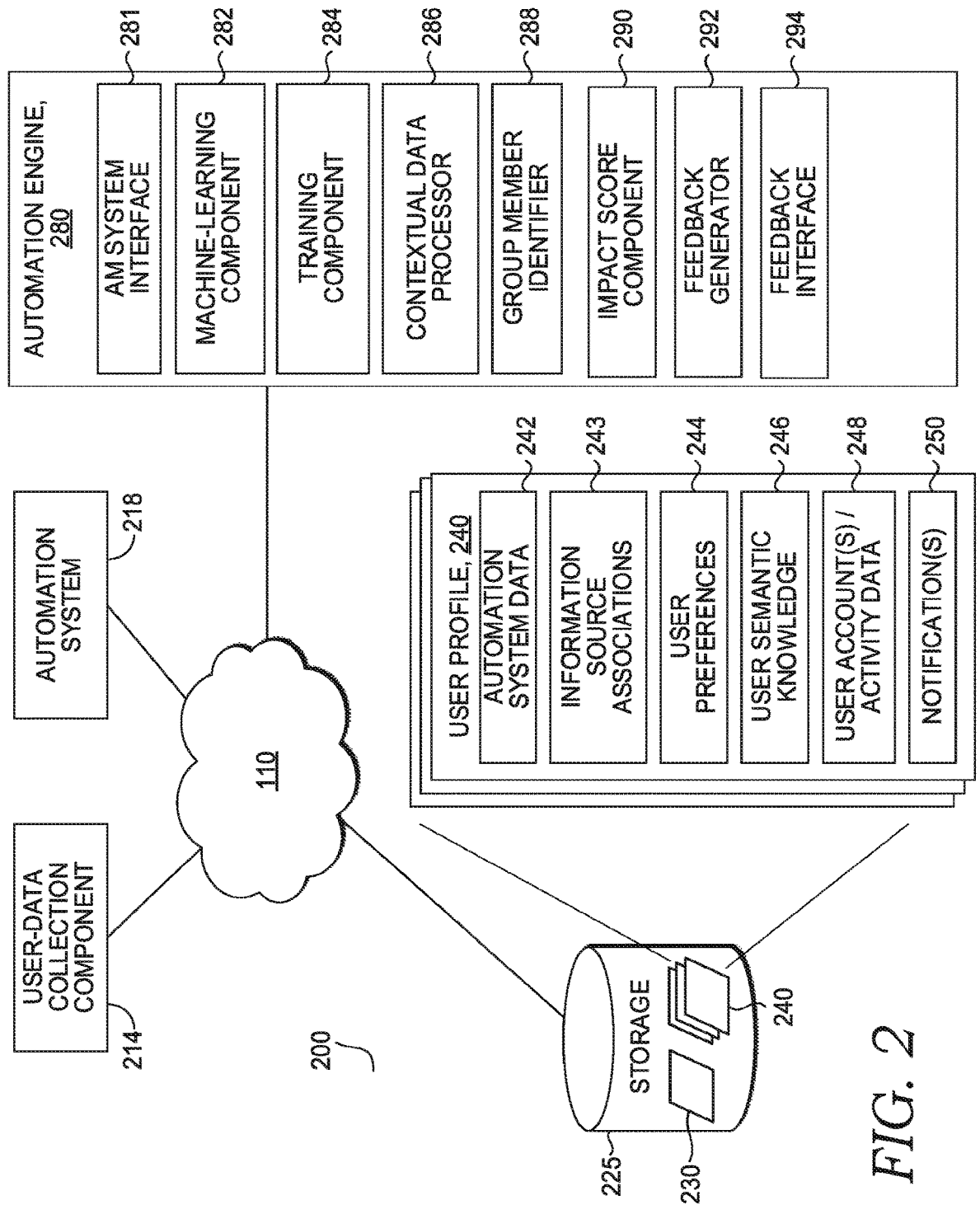
FIG. 2 is a diagram depicting an example computing architecture suitable for implementing aspects of the technology described herein.

Operating environment 100 can be utilized to implement one or more of the components of system 200, described in FIG. 2, including components for collecting user data, monitoring events, generating communication notifications, determining user availability, and/or presenting notifications and related received communications to users at a contextually appropriate intrusiveness level.

Referring now to FIG. 2, with FIG. 1, a block diagram is provided showing aspects of an example computing system architecture suitable for implementing an aspect of the technology described herein and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 214, automation engine 280, automation system 218, and storage 225. Automation engine 280 (including its components 281, 282, 284, 286, 288, 290, 292, and 294), user-data collection component 214, and automation system 218 may be embodied as a set of compiled computer instructions or functions, program modules, computer software services, or an arrangement of processes carried out on one or more computer systems, such as computing device 900 described in connection to FIG. 9, for example.

In one aspect, the functions performed by components of system 200 are associated with one or more personal assistant applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects functionality of these components can be shared or distributed across other components.

Continuing with FIG. 2, user-data collection component 214 is generally responsible for accessing or receiving (and in some cases also identifying) user data from one or more data sources, such as data sources 104*a* and 104*b* through 104*n* of FIG. 1. In some aspects, user-data collection component 214 may be employed to facilitate the accumulation of user data of one or more users (including crowdsourced data) for automation engine 280. The data 230 may be received (or accessed), and optionally accumulated, reformatted, and/or combined, by user-data collection component 214 and stored in one or more data stores such as storage 225, where it may be available to the automation engine 280. For example, the user data 230 may be stored in or associated with a user profile 240, as described herein. In some aspects, any personally identifying data (i.e., user data that specifically identifies particular users) is either not uploaded from the one or more data sources with user data, is not permanently stored, and/or is not made available to automation engine 280.

User data may be received from a variety of sources where the data may be available in a variety of formats. The user data can be contextual data used to select an automation setting and train a machine-learning process, as described subsequently. For example, in some aspects, user data received via user-data collection component 214 may be determined via one or more sensors, which may be on or associated with one or more user devices (such as user device 102*a*), servers (such as server 106), automation systems (such as automation system 108*a*), and/or other computing devices. As used herein, a sensor may include a function, routine, component, or combination thereof for sensing, detecting, or otherwise obtaining information, such as user data from a data source 104*a*, and may be embodied as hardware, software, or both. User data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and e-mails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, e-commerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein. In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an e-mail account, a credit card account, or other data sources. In some aspects, user-data collection component 214 receives or accesses data continuously, periodically, or as needed.

It may be appreciated that, in some aspects, a wide variety of information, such as temporal information and/or locational information, may be evaluated to identify sensor data and/or supplement sensor data (e.g., a user's primary calendar may be used to identify conflicts and/or verify activities derived from sensor data; sensor data may be evaluated against real-time data, such as traffic information, weather, or supplemental information, which may include information from the user's social media accounts, family or friends' social media accounts, e-mail, news, and other user data (e.g., crowdsourced data)). In this way, the complementary calendar may be constructed with one or more entries derived from sensor data (e.g., automatically generated entries based upon inferred activities). In an aspect, a complementary calendar may be merged with one or more calendars (e.g., the user's primary calendar, a family calendar, a social network calendar) to create a shadow calendar comprising at least some of the complementary calendar (e.g., automatically generated entries derived/inferred from sensor data) and at least some of the one or more calendars (e.g., user entries populated within the primary calendar by the user). User availability for scheduling feedback notifications (or otherwise providing an information item) may then be determined based on the calendar information.

The automation system 218 (like automation system 108) can be any type of computing device capable of automatically controlling a system that produces a real-world output. The automation system 218 could be an environmental control system that controls room temperature via an HVAC system, controls lighting, sound level, floor control (e.g., which user device presents on a main screen, which user device controls a primary presentation) in a multi-person meeting, and such. The automation system 218 could be an automated hospitality system that orders food and drinks for a meeting in an office setting. The automation system 218 could be an in-car entertainment system that controls, among other aspects, an audio system output (e.g., radio, satellite radio, CD, Bluetooth input, or DVD). The automation system 218 could be an entertainment control system in a bar, restaurant, or other public accommodation that selects entertainment outputs based on interests of people present at the place of accommodation.

An automated system 218 controls an environment by adjusting values for automated settings. An automation setting defines a desired system output for a system. A single automated system can have multiple automated settings. For example, automated settings for a thermostat can include a room temperature and fan on/off/automatic. The automation setting value for the room temperature feature could be 74° F. The thermostat measures the room temperature and then calls for heat or cooling from the associated HVAC system to keep the room at 74° F. The system output is controlling room temperature at 74° F.

At a high level, aspects of automation engine 280 may determine when feedback should be solicited. The automation engine 280 can also retrain a machine-learning process and use a machine-learning process to select the automation setting value in the first place. All or part of the automation engine 280 may be included in the automation system 218. In another aspect, parts of the automation engine 280 are separate from the automation system 218.

The automation engine 280 includes several subcomponents. The subcomponents include automation system interface 281, machine-learning component 282, training component 284, contextual data processor 286, group member identifier 288, impact score component 290, feedback generation component 292, and feedback interface component 292. The automation engine 280 and the functions associated therewith may be distributed across the system 200. For example, the components could be distributed between servers and a client device, such as a smartphone. In some aspects, automation engine 280 and/or one or more of its subcomponents may determine interpretive data from received user data. Interpretive data corresponds to data utilized by the subcomponents of automation engine 280 to interpret user data. For example, interpretive data can be used to provide context to user data, which can support determinations or inferences made by the subcomponents. As an example a GPS signal corresponding to a gym location and an elevated heart rate may be interpreted together to form an exercise event, which is its own signal. Moreover, it is contemplated that aspects of automation engine 280 and its subcomponents may use user data and/or user data in combination with interpretive data for carrying out the objectives of the subcomponents described herein.

Some aspects of automation engine 280 use statistics and machine-learning techniques. In particular, such techniques may be used to determine pattern information associated with a user, such as communication patterns, user knowledge such as semantic understanding of the user, relevance of venues and information to the user, and urgency. For example, using crowdsourced data, aspects of the technology described herein can learn to associate keywords or other context and information item features with higher levels of relevance or urgency, based on determining how other users respond or react to information items with those features. In one aspect, pattern recognition, fuzzy logic, neural network, finite state machine, support vector machine, clustering, or similar statistics and machine learning techniques are applied.

The automation system interface 281 communicates with other components to receive data, such as from user-data collection component 214 and automation system 218. The interface 281 can use application program interfaces (APIs) to communicate with other components, including issuing control instructions.

The machine-learning component 282 selects the appropriate automated setting value for each setting to be controlled by the automation system. Use of different machine-learning processes are possible in different aspects including, supervised learning processes (e.g., decision tree, random forest, logistic regression), unsupervised learning (e.g., apriori algorithm, K-means), or reinforcement learning. In each case, the contextual data is an input used to determine the appropriate primary preference value in the given context. The term primary preference means the most likely value for the given context. A given context can be associated with different values, though typically with different confidence factors or other measure of fit. The primary preference is associated with the highest confidence factor or other measure of fit to the context.

Each of these machine-learning methods also uses historical contextual data and associated automated setting values to determine the desired setting in the present. This data can be collected as automated setting event data, as described previously. The different types of a machine-learning processes can use the historical data differently.

The supervised learning processes use the historical contextual data as independent variables and the associated automated setting observation as the dependent variable. The historical data is used to train a function (different supervised learning processes can use different functions) to map to the contextual data to the output. In this way, the function should predict the desired outcome (i.e., automated setting) given a similar contextual data as input.

The contextual data is preprocessed to fit a schema that can be used to input data to the function during both training and use. The schema can include fields for the input of explicit user feedback. The field can take multiple forms, but in one aspect, the field provides an indication of a correlation between a specific contextual feature value and an automated setting value. For example, the field could indicate that recent exercise is correlated to turning the ceiling fan on.

The unsupervised learning method generally attempts to cluster people or objects based on similar characteristics. This may be suitable for finding some automated settings, for example, a common interest in entertainment, food preference, etc. The group characteristics (e.g., enjoys action movies) can then be used to recommend an action movie that the user has not yet seen. The unsupervised learning uses contextual data to classify the user at a point in time as similar to others in a similar context. In addition to contextual data, anything else known about the user (e.g., semantic data) can be used in combination to place a user in a similar group. Feedback can be used to set an individual characteristic for a contextual variable or semantic value that is used to find similarities. Actions taken or settings used by the similar group can be used to select an automated setting value.

The technology can also use reinforcement learning, which trains the machine to make specific decisions, such as select an automation setting value. In reinforcement learning, the machine trains itself using trial and error using historical data. The machine can learn how to incorporate user feedback, which should act as a strong signal, to make a decision.

While different machine-learning processes can be used, including different processes for different automation settings, they all use historical automation event data and current contextual data. The historical automation event data comprises an automation setting and associated contextual data. Each event can be associated with one or more users.

The technology described herein works with both individual automation preferences and group automation preferences. A group preference is uniquely calculated to address preferences for a group comprising two or more members. The group preference can be calculated using individual preferences as an input and/or through direct observation of automation settings and context when a group of people is together. The group preference can be directly assigned through a machine-learning process.

In one aspect, individual preferences are determined and then combined to select a preference setting for a group. The group preference can be an average of individual preferences when the automation setting is suitable for averaging. For example, a room temperature group preference for a meeting could be the average of individual temperature setting preferences for their home or offices. On the other hand, favorite food type for an automated lunch or snack order is not suitable for averaging.

As an alternative to averaging, a highest cumulative rank from individual settings can selected. For example, in the food-ordering context, each individual's food preferences could be ranked (e.g., 1. Italian, 2. Mexican, 3. Chinese, 4. Indian, . . . ). The combined rankings could be used to calculate a group preference. For example, the cumulative rank for Italian food could be 1+4+2+3+1=11 for a five-member group where the group members rank Italian food as first, fourth, second, third, and first, respectively. The rankings for individual users can be derived from eating events. Similar scores could be calculated for other food genres and the lowest score (signifying the highest cumulative rank) selected. As a variation, the ranks for each user could be weighted based on one or more criteria. Criterion can include pickiness, job position, food variation, and such. For example, a food pickiness weighting could increase the weight given to a preference of a picky user.

The training component 284 trains the machine-learning process. As part of the training process, the training component 284 can collect training data, which can be described herein as automation-setting events. An automation-setting event comprises a record of the automation setting and associated contextual data at a point in time when the automation setting was active. For example, an automation-setting event can comprise a room temperature setting at a point in time along with people present in the room at the point in time. In one aspect, automation-setting events can be analyzed to determine a preferred setting, identify secondary preferences, and determine whether the preferred setting or a secondary setting should be selected.

The contextual data processor 286 receives contextual data and processes it, as needed, for training purposes or for consumption by the machine-learning component 282. The contextual data processor 286 can convert contextual data to the correct format for use by another component.

A context is defined by machine observable contextual signals. A contextual signal describes a state of a user, user device, the environment, or some other factor that can change independently from the automation setting. For example, the contextual signal could be a time of day, outside temperature, browsing activity, social posts, and such.

The group member identifier 288 can identify group members that share an environment. The group members can be identified through their devices, meeting invites, voice recognition, facial recognition, or some other means.

The impact score component 290 generates an impact score that is used to determine whether feedback should be solicited. The technology can use several heuristics to calculate an impact score. Alternatively, hypothetical feedback can be used to simulate a change in a confidence score calculated by the machine-learning process that would result from feedback.

First, a nearness of a confidence score calculated for a preference to an action/inaction threshold can be used to calculate an impact score. The action/inaction threshold can be used to determine whether the automation system takes an action. For example, the confidence score may need to be above 0.50 before an automation system would recommend a lighting preference. The nearer the threshold the better the candidate the automation preference (or other event being classified) is for feedback. The nearness to the threshold means the classifier was comparatively uncertain about what to do with the setting in the present context and feedback can significantly improve the confidence score. The impact score can be a function of the nearness.

Alternatively, a simulation could be run. In this situation, the feedback impact score could be a function of the actual confidence factor (or other machine-learned measure) calculated and a hypothetical confidence factor calculated in the same context, but this time with affirmative or negative feedback. The impact score can be calculated for both a hypothetical affirmative and a negative response. For example, assume an original confidence score of 0.75 in setting A and a threshold of 0.70. This means that setting A would be automatically set, but the confidence score is close to the threshold. Close could be 10%, 0.10 score points, or some other measure. If feedback indicated that setting A is correct in the present context (or list a specific contextual factor), then the confidence factor could change to 0.95. The impact score could be the difference, which is 0.20, or related to the difference.

Second, the amount of context available for an environmental preference can be used to calculate the impact score. In general, the more context the better. More robust event data makes better training data. Confirming the desired output when rich contextual data is available can be more valuable than confirming the desired output through feedback when the contextual data is sparse because a correlation between several factors and an output is strengthened. The classifier is trained by inputting event records into the classifier and then comparing against output. Each event record is associated with contextual features, perhaps up to 30 different features in some cases. For example, an environmental preference record for a meeting may include the context features of location, time, duration, attendees, meeting organizer, people declining, activity engagement, devices present, content presented, food served, light settings, HVAC settings, light adjustments during the meeting, HVAC adjustment during the meeting, speaker volume, HVAC preferences of attendees derived from home or work data to name a few. If little context is known about a group event, much of the environmental event record will be blank and will be less useful for providing training data. Feedback should not be sought when less than a threshold amount of context is available, especially when the contextual features often have values associated with them at other times.

The impact score may be determined by comparing the contextual features that usually have associated values in combination with the observed automation setting with how many contextual features have data in the current instance. A below average amount of data will cause a lower impact score. This analysis looks at all of the contextual data together, rather than at specific contextual features. The overall data scarcity could tend to lower the impact score.

Third, data scarcity. This cuts against the second factor somewhat and needs to be balanced. In some cases, certain contextual factors may be absent from or rarely found in a user's event record. For example, a user that does not own a car may not have any event records associated with driving a car. In this case, no record of environmental preferences while the user is driving may exist. Therefore, soliciting feedback on a single instance of an environmental record captured while the user is driving can provide significant training gains.

In another aspect, a simulation is performed using hypothetical feedback that associates a contextual feature with the secondary value. In one simulation, the machine-learning process used to select the primary preference value is rerun using the feedback. The impact score can be a difference between an original confidence factor associated with the primary preference value without the feedback and the new confidence factor associated with the primary preference value. It should be noted that both a positive and negative response to feedback can be simulated.

One or more of these factors can be combined to form an impact score. Alternatively, one method can be used.

The feedback generator component 292 generates a feedback solicitation. The solicitation can be generated using templates. The templates can be completed by inserting contextual values and preferences, as described subsequently. In general, the feedback solicitation can be built using a feedback template. The feedback template can include a placeholder to describe the contextual feature, the contextual value associated with the contextual feature, and an automation setting value. The automation setting value can be the primary preference, the secondary preference, or some other value of interest. The template can ask the user whether the automated setting, such as the secondary preference, was selected because the contextual feature was associated with the contextual value.

Figure 3:
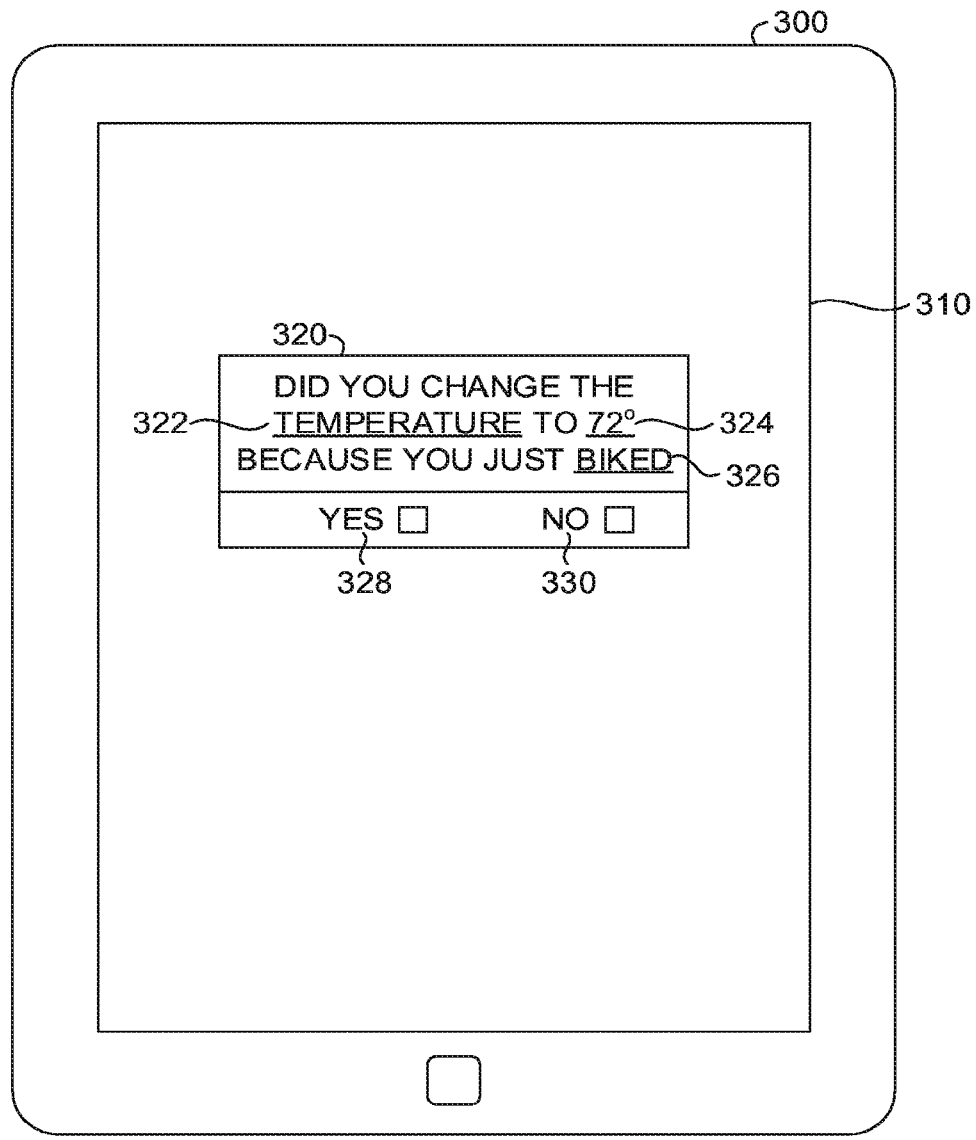
FIG. 3 is a diagram depicting an individual feedback solicitation for an individual, in accordance with an aspect of the technology described herein.
Figure 5:
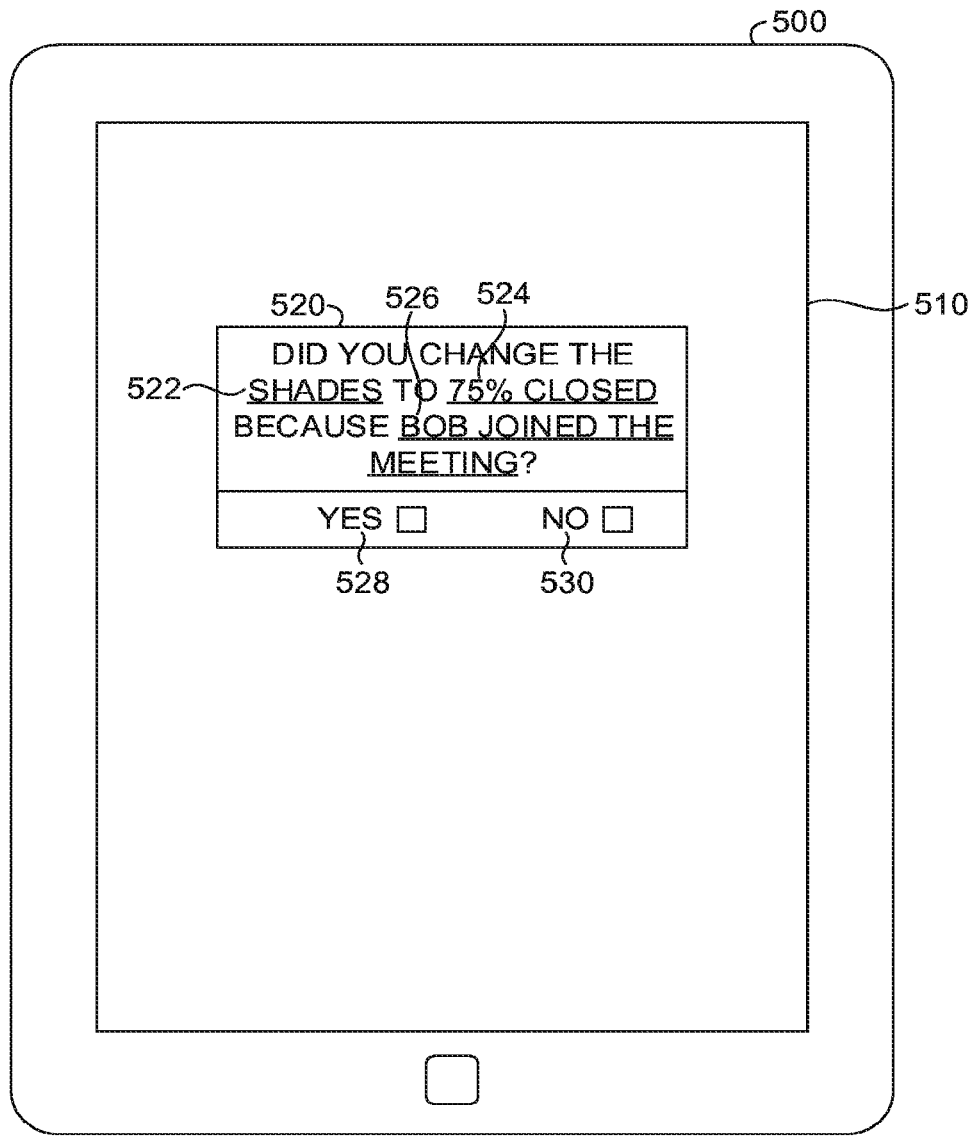
FIG. 5 is a diagram depicting a group feedback solicitation for an individual, in accordance with an aspect of the technology described herein.

The feedback interface component 294 outputs a solicitation, as shown with reference to FIGS. 3 and 5. The interface 294 can also receive feedback and communicate it to training component 284.

Example system 200 also includes storage 225. Storage 225 generally stores information including data, computer instructions (e.g., software program instructions, routines, or services), logic, profiles, and/or models used in aspects of the technology described herein. In an aspect, storage 225 comprises a data store (or computer data memory). Further, although depicted as a single data store component, storage 225 may be embodied as one or more data stores or may be in the cloud.

In one aspect, storage 225 stores one or more user profiles 240, an example aspect of which is illustratively provided in FIG. 2. Example user profile 240 may include information associated with a particular user or, in some instances, a category of users, such as users present in the same venue(s). As shown, user profile 240 includes automation system data 242 (which may include automation system usage pattern data), automation system associations 243 (which may identify automation systems associated with the user), user preferences 244, user semantic knowledge 246 (or a user knowledge base), user account(s) and activity data 248, and notification(s) 250. The information stored in user profiles 240 may be available to the routines or other components of example system 200.

User preferences 244 generally include user settings for automation systems, as described herein. For example, user preferences 244 may store user feedback and settings indicating an automation setting value. In some aspects, users can assign constraints or priorities to feedback requests.

User semantic knowledge 246 generally comprises a set of information inferred or otherwise determined about the user, and may be embodied as a knowledge base. User information determined from user data (including feedback and other user input) may be stored in user semantic knowledge 246.

User account(s) and activity data 248 generally includes user data collected from user-data collection component 214 (which in some cases may include crowdsourced data that is relevant to the particular user), and may be used for determining semantic knowledge about the user. (In some aspects, user account(s) and activity data 248 includes user semantic knowledge 246.) In particular, user account(s) and activity data 248 can include user data regarding user e-mails, texts, instant messages, calls, and other communications; social network accounts and data, such as news feeds; online activity; and calendars, appointments, or other user data that may be used for determining relevance, urgency, scheduling, contextual information, and/or supplemental information. Aspects of user account(s) and activity data 248 and/or user semantic knowledge 246 may store information across one or more databases, knowledge graphs, or data structures.

Notification(s) 250 generally includes data about pending notifications associated with a user, which may include notification content corresponding to one or more information items. In some aspects, notification(s) 250 includes a schedule associated with a notification, data corresponding to notifications that have not yet been presented to a user, or supplemental content that may not be provided to a user. (Further, in some aspects, notification(s) 250 may also include information about previously pending notifications.) The notifications could include a to-do list or similar.

FIG. 3 shows a feedback solicitation 320 presented to an individual, in accordance with an embodiment of the present invention. The feedback solicitation 320 is output through the display screen 310 of a computing device 300. The computing device 300 is depicted as a tablet computer, but could just as easily be any other type of client device.

The feedback solicitation 320 asks the user to select yes 328 or no 330 in response to the question, "Did you change the temperature to 72° because you just biked?" This feedback solicitation 320 could be used to optimize an environmental control system, which is one example of an automated system. In this example, the primary preference for a given context could be 74°. The user manually lowering the temperature to 72° could trigger an opportunity for feedback. As described elsewhere, an impact score may be calculated before the feedback solicitation 320 is generated and output. In this case, the impact score satisfied the criteria for generating a solicitation.

Feedback solicitations can be built using a solicitation template. Different types of automation systems can be associated with unique templates. The template shown includes blanks where the underlined words are inserted into preformatted text. The template could be represented as "Did you change the °°automated setting>> to << manually entered value>> because you just <<contextual feature>>?" The automated setting is temperature 322. The manually entered value is 72° 324 and the associated contextual feature is biked 326. When the blanks are filled in appropriately, the feedback solicitation 320 results.

The user's feedback of yes 328 or no 330 can be processed to improve the automation system.

Figure 4:
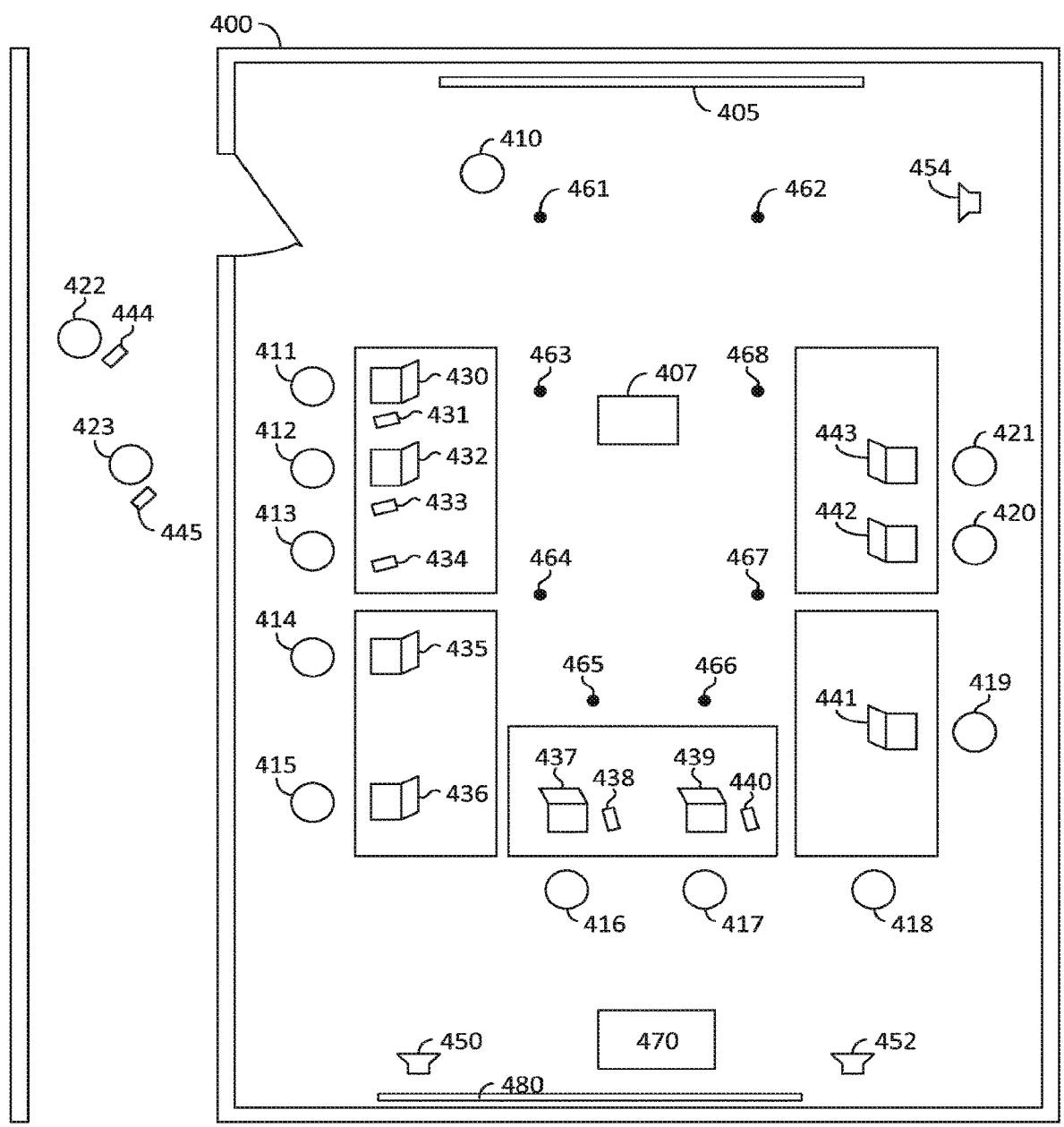
FIG. 4 is a diagram depicting a group environment having automated controls, in accordance with an aspect of the technology described herein.

FIG. 4 shows an exemplary group area 400 with objects and devices that can provide input to an automation system, in accordance with an embodiment of the present invention. Group area 400 is the interior of a conference room and includes many features that can be controlled by an automation system. For example, the lighting, room temperature, hospitality service (e.g., food and drinks), audio volume, floor control, and other features can all be controlled by an automation system. The automation system can look at individual interactions and group interactions with these automation settings to select the primary preference.

A group setting poses challenges not present in the individual setting. For example, data may not be available for one or more group members. It can also be unclear which group member provided the input to change an automation setting. It may not be desirable to solicit feedback from all group members. Selecting the best group member to solicit feedback from is a problem present in the group setting.

The group area 400 includes a primary display 405. In one embodiment, the primary display 405 is a flat screen TV or other self-contained display apparatus. In another embodiment, the primary display 405 is a screen for displaying images from projector 407. There are a number of people within the room. The presenter 410 is at the front of the room giving a presentation. Audience members include persons 411, 412, 413, 414, 415, 416, 417, 418, 419, 420, and 421. Passers-by 422 and 423 are located outside of the performance area.

The passers-by 422 and 423 are both carrying phone 444 and 445, respectively.

The group area 400 also includes multiple computing devices. The computing devices include laptop 430, smartphone 431, laptop 432, smartphone 433, smartphone 434, laptop 435, laptop 436, laptop 437, smartphone 438, laptop 439, smartphone 440, laptop 441, laptop 442, and laptop 443. For the sake of simplicity, only laptops and smartphones were used in this example. Slates/tablets/e-readers and other devices could be included. Each of these devices may be associated with a person nearby. For example, person 411 is presumptively associated with laptop 430 and smartphone 431. In some cases, individual people in the room are identified through their devices even though their associated devices may not otherwise interact with an automation system.

In some aspects, computing devices are associated with the person for the sake of passing floor control. Floor control in a conference setting, or game setting, gives the person certain privileges not enjoyed by those without floor control. For example, floor control allows the person to use their computing devices to change content on the primary display 405 or other displays in the network. Designating the floor control can be an automated setting. For example, the person scheduling the meeting could automatically be given floor control upon connecting their computer to a room automation system.

The group area 400 also includes a series of room microphones. The room microphones include microphones 461, 462, 463, 464, 465, 466, 467, and 468. The group area 400 also includes cameras 450, 452, and 454. In one embodiment, these cameras are depth cameras. The cameras may be portable. For example, the cameras may be moved into the room for a particular presentation and, thus, their exact location may not be known. In another embodiment, one or more of the cameras are fixed in the room and not portable.

The group area 400 also includes control center 470. The control center 470 may serve as a central control for the automation system. The control center 470 may, for example, be communicatively coupled to the room microphones 461, 462, 463, 464, 465, 466, 467, and 468 and cameras 450, 452, and 454. Shades 480 cover a window. For the sake of example, assume the primary preference determined by a machine-learning process is for the window shade 480 to be closed based on the contextual data analyzed for the meeting. A user manually opening the shade from 100% closed to 75% could trigger a feedback opportunity, since an open shade setting does not match the predicted primary preference. A feedback solicitation, such as shown in FIG. 5, could be generated.

FIG. 5 shows a feedback solicitation 520 presented to an individual, in accordance with an embodiment of the present invention. The feedback solicitation 520 is output through the display screen 510 of a computing device 500. The computing device 500 is depicted as a tablet computer, but could just as easily be any other type of client device.

The feedback solicitation 520 asks the user to select yes 528 or no 530 in response to the question, "Did you change the shades to 75% closed because Bob joined the meeting?" This feedback solicitation 520 could be used to optimize the setting on the blinds, which is one example of an automated system. In this example, the primary preference for a given context could be 100% closed. The user manually changing the shade setting to 75% closed could trigger an opportunity for feedback. As described elsewhere, an impact score may be calculated before the feedback solicitation 520 is generated and output. In this case, the impact score satisfied the criteria for generating a solicitation.

A threshold question may be whom should receive the solicitation feedback. Some users in a room may not be accessible to the feedback system, for example, because they've expressed a preference to not receive feedback solicitations. Those users can be eliminated because it is not possible to send them a solicitation feedback in the first case. In one aspect, a user that made the manual change that triggered the feedback opportunity is solicited. In another aspect, the person solicited is the one whose answer would provide the highest impact. Feedback from different users could be modeled to determine an impact score for each available contextual feature in combination with a user providing the feedback.

Feedback solicitations can be built using a solicitation template. Different types of automation systems can be associated with unique templates. The template shown includes blanks where the underlined words are inserted into preformatted text. The template could be represented as "Did you change the <<automated setting>> to << manually entered value>> because <<contextual feature>> ?" The automated setting is shades 522. The manually entered value is 75% closed 524 and the associated contextual feature is Bob joined the meeting 526. When the blanks are filled in appropriately, the feedback solicitation 520 results. Notice that a person's presence in a meeting can be a contextual feature.

The user's feedback of yes 528 or no 530 can be processed to improve the automation system.

Figure 6:
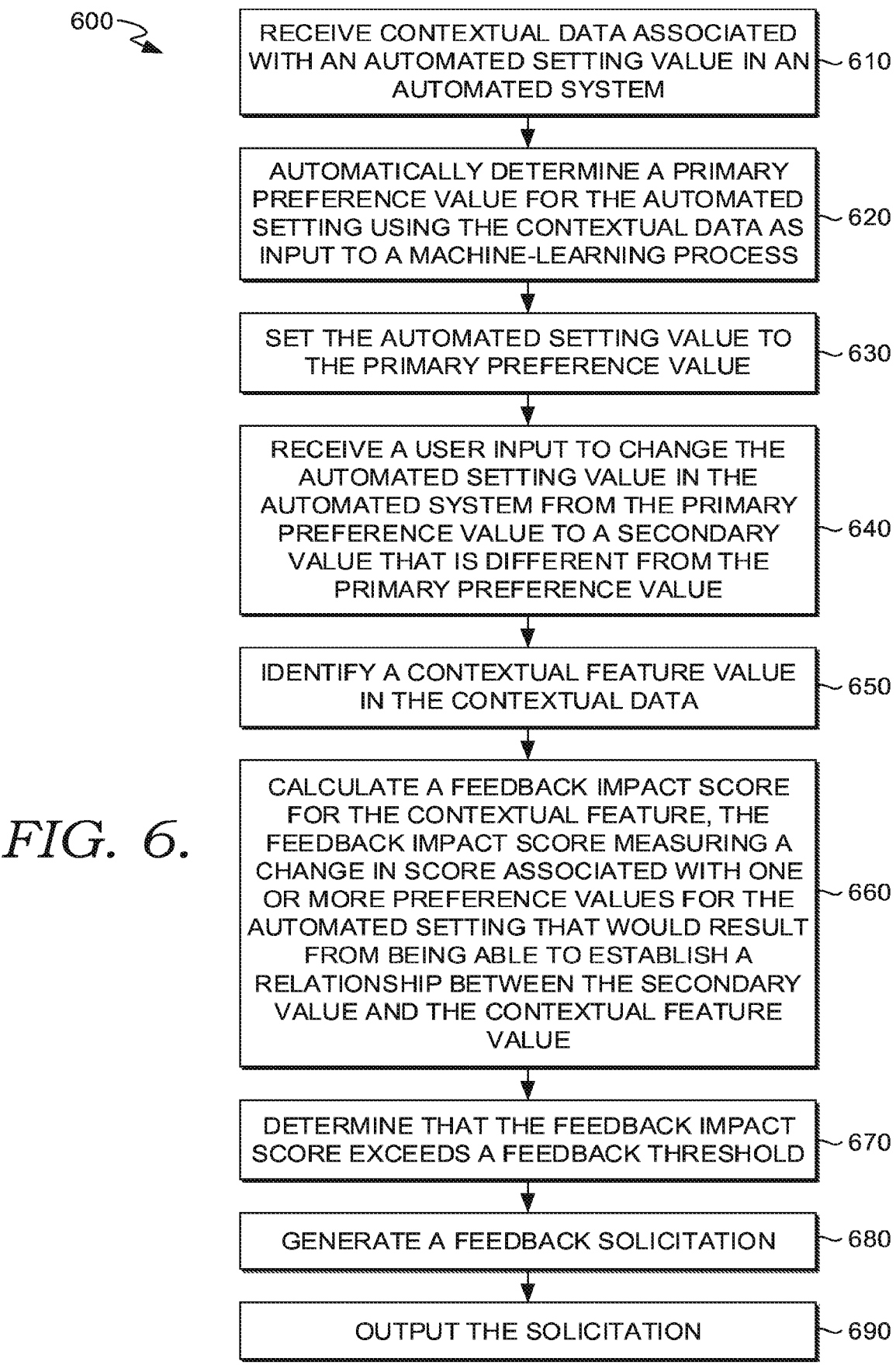
FIGS. 6-8 depict flow diagrams of methods for determining an automation setting preference, in accordance with an aspect of the technology described herein.

Turning now to FIG. 6, a method 600 for determining an automation setting preference is provided, according to an aspect of the technology described herein.

At step 610, contextual data associated with an automated setting value in an automated system is received. An automation system has been described previously, but in brief, it uses machine learning to select an automated setting value for an automated control. An automated control is any feature of the system capable of control by the automation system. The automation system can be integrated with the control system or may be a separate entity that communicates with the automation control system. For example, the automation system could reside in a server farm or on a client device and control a home entertainment system.

The contextual data can be provided periodically for reevaluation of the automation setting value, for example, contextual data can be provided every 30 minutes. Alternatively, the contextual data can be provided in response to a trigger, such as a change in contextual data. Another trigger is detection of an event that will be impacted by one or more controls controllable by the automation system. For example, scheduling a meeting in a conference room may trigger providing contextual information about the meeting so that audio, visual, and hospitality controls can be selected.

The contextual data comprises contextual features and associated values. For example, a contextual feature could be room temperature and the associated contextual value could be 72° F. The contextual data can vary from situation to situation and time to time. In some cases, contextual data is not known for one or more contextual features. Contextual data provided in any instance can be for the features where data is available.

At step 620, a primary preference value for the automated setting is automatically determined using the contextual data as input to a machine-learning process. The primary preference value is the value the machine-learning process most closely associates with the present context.

Use of different machine-learning processes are possible in different aspects, including supervised learning processes (e.g., decision tree, random forest, logistic regression), unsupervised learning (e.g., apriori algorithm, K-means), or reinforcement learning. In each case, the contextual data is an input used to determine the appropriate primary preference value in the given context. The term primary preference means the most likely value for the given context. A given context can be associated with different values, though typically with different confidence factors or other measure of fit. The primary preference is associated with the highest confidence factor or other measure of fit to the context.

Each of these machine-learning methods also uses historical contextual data and associated automated setting values to determine the desired setting in the present. This data can be collected as automated setting event data, as described previously. The different types of a machine-learning processes can use the historical data differently.

The supervised learning processes use the historical contextual data as independent variables and the associated automated setting observation as the dependent variable. The historical data is used to train a function (different supervised learning processes can use different functions) to map the contextual data to the output. In this way, the function should predict the desired outcome (i.e., automated setting) given a similar contextual data as input.

The contextual data is preprocessed to fit a schema that can be used to input data to the function during both training and use. The schema can include fields for the input of explicit user feedback. The field can take multiple forms, but in one aspect, the field provides an indication of a correlation between a specific contextual feature value and an automated setting value. For example, the field could indicate that recent exercise is correlated to turning the ceiling fan on.

The unsupervised learning method generally attempts to cluster people or objects based on similar characteristics. This may be suitable for finding some automated settings, for example, a common interest in entertainment, food preference, etc. The group characteristics (e.g., enjoys action movies) can then be used to recommend an action movie that the user has not yet seen. The unsupervised learning uses contextual data to classify the user at a point in time as similar to others in a similar context. In addition to contextual data, anything else known about the user (e.g., semantic data) can be used in combination to place a user in a similar group. Feedback can be used to set an individual characteristic for a contextual variable or semantic value that is used to find similarities. Actions taken or settings used by the similar group can be used to select an automated setting value.

The technology can also use reinforcement learning, which trains the machine to make specific decisions, such as select an automation setting value. In reinforcement learning, the machine trains itself using trial and error using historical data. The machine can learn how to incorporate user feedback, which should act as a strong signal, to make a decision.

At step 630, the automated setting value is set to the primary preference value.

At step 640, a user input is received to change the automated setting value in the automated system from the primary preference value to a secondary value that is different from the primary preference value. The user changing the automated setting suggests that the primary preference was not the correct value for the context. (The change could also represent signal noise since many use patterns are not entirely consistent.) Either way, feedback can help the system decide whether the user changing the setting represents an error in selection or just random variation in user preferences.

At step 650, a contextual feature is identified in the contextual data. A heuristic may be applied to select the contextual feature. For example, in one aspect, the contextual feature is associated with a value within the contextual data. As mentioned, the contextual data can include features that have no data, and therefore, no value. The technology may limit feedback solicitation to contextual features that have values.

The heuristic can look for contextual feature values that have more variability than other features. In other words, the value associated with the contextual feature changes from contextual data set to contextual data set. A heuristic could also look for a contextual feature that typically does not include data. A heuristic could look for a value that is usually constant, but changed in this case.

At step 660, a feedback impact score is calculated for the contextual feature. The feedback impact score measures a change in score associated with one or more preference values for the automated setting that would result from being able to establish a relationship between the secondary value and the contextual feature value. The score change can be for a confidence score or other measure of fit between the contextual data and the setting value calculated by the machine-learning process.

Multiple methods of calculating the feedback impact score are possible including heuristic and simulation. A heuristic method uses a series of rules to assign an impact score, such as described previously with reference to FIG. 2. For example, points can be assigned for frequency of appearance within contextual data. A contextual feature that does not typically have associated data for a user (or in general) may be given a high score because understanding the association of this contextual data with an automation setting can significantly improve the operation of the machine-learning process.

In another aspect, a simulation is performed using hypothetical feedback that associates a contextual feature with the secondary value. In one simulation, the machine-learning process used to select the primary preference value is rerun using the feedback. The impact score can be a difference between an original confidence factor associated with the primary preference value without the feedback and the new confidence factor associated with the primary preference value. It should be noted that both a positive and negative response to feedback can be simulated.

In one aspect, the simulation may require retraining a machine-learning process using the feedback and then calculating a new confidence score given the original contextual information. The original machine-learning model can be preserved and only a temporary copy is retrained.

At step 670, the feedback impact score is determined to exceed a feedback threshold. If the feedback impact score did not exceed the feedback, then a feedback impact score could be calculated for a second contextual feature. This process could be repeated until a contextual feature is identified that has an impact score above the threshold.

At step 680, a feedback solicitation is generated. FIGS. 3 and 5 both provide exemplary feedback solicitations. In general, the feedback solicitation can be built using a feedback template. The feedback template can include a placeholder to describe the contextual feature, the contextual value associated with the contextual feature and an automation setting value. The automation setting value can be the primary preference, the secondary preference, or some other value of interest. The template can ask the user whether the automated setting, such as the secondary preference, was selected because the contextual feature was associated with the contextual value.

At step 690, the solicitation for feedback is output. The solicitation feedback can be an audio solicitation or a visual solicitation. In one aspect, feedback is received and used to update the machine-learning process.

Figure 7:
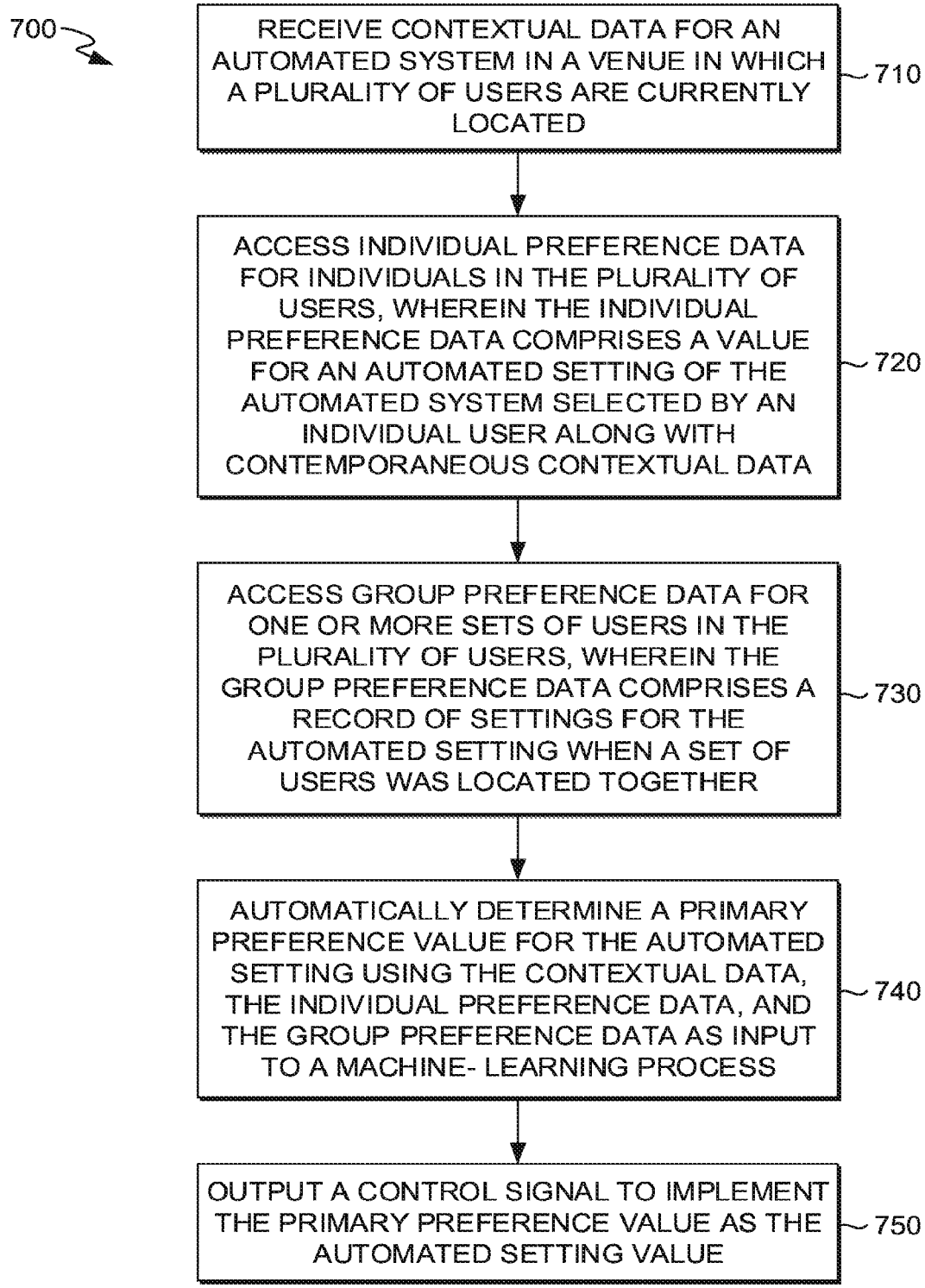

Turning now to FIG. 7, a method 700 for determining an automation setting preference is provided, according to an aspect of the technology described herein.

At step 710, contextual data is received for an automated system in a venue in which a plurality of users are currently located. An automation system has been described previously, but in brief, it uses machine learning to select an automated setting value for an automated control. An automated control is any feature of the system capable of control by the automation system. The automation system can be integrated with the control system or may be a separate entity that communicates with the automation control system. For example, the automation system could reside in a server farm or on a client device and control a home entertainment system.

The contextual data can be provided periodically for reevaluation of the automation setting value, for example, contextual data can be provided every 30 minutes. Alternatively, the contextual data can be provided in response to a trigger, such as a change in contextual data. Another trigger is detection of an event that will be impacted by one or more controls controllable by the automation system. For example, scheduling a meeting in a conference room may trigger providing contextual information about the meeting so that audio, visual, and hospitality controls can be selected.

The contextual data comprises contextual features and associated values. For example, a contextual feature could be room temperature and the associated contextual value could be 72° F. The contextual data can vary from situation to situation and time to time. In some cases, contextual data is not known for one or more contextual features. Contextual data provided in any instance can be for the features where data is available.

At step 720, individual preference data is accessed for individuals in the plurality of users. The individual preference data comprises a value for an automated setting of the automated system selected by an individual user along with contemporaneous contextual data.

At step 730, group preference data is accessed for one or more sets of users in the plurality of users. The group preference data comprises a record of settings for the automated setting when a set of users experienced the setting together.

At step 740, automatically determine a primary preference value for the automated setting using the contextual data, the individual preference data, and the group preference data as input to a machine-learning process.

Use of different machine-learning processes are possible in different aspects, including supervised learning processes (e.g., decision tree, random forest, logistic regression), unsupervised learning (e.g., apriori algorithm, K-means), or reinforcement learning. In each case, the contextual data is an input used to determine the appropriate primary preference value in the given context. The term primary preference means the most likely value for the given context. A given context can be associated with different values, though typically with different confidence factors or other measure of fit. The primary preference is associated with the highest confidence factor or other measure of fit to the context.

Each of these machine-learning methods also uses historical contextual data and associated automated setting values to determine the desired setting in the present. This data can be collected as automated setting event data, as described previously. The different types of a machine-learning processes can use the historical data differently.

The supervised learning processes use the historical contextual data as independent variables and the associated automated setting observation as the dependent variable. The historical data is used to train a function (different supervised learning processes can use different functions) to map to the contextual data to the output. In this way, the function should predict the desired outcome (i.e., automated setting) given a similar contextual data as input.

The contextual data is preprocessed to fit a schema that can be used to input data to the function during both training and use. The schema can include fields for the input of explicit user feedback. The field can take multiple forms, but in one aspect, the field provides an indication of a correlation between a specific contextual feature value and an automated setting value. For example, the field could indicate that recent exercise is correlated to turning the ceiling fan on.

The unsupervised learning method generally attempts to cluster people or objects based on similar characteristics. This may be suitable for finding some automated settings, for example, a common interest in entertainment, food preference, etc. The group characteristics (e.g., enjoys action movies) can then be used to recommend an action movie that the user has not yet seen. The unsupervised learning uses contextual data to classify the user at a point in time as similar to others in a similar context. In addition to contextual data, anything else known about the user (e.g., semantic data) can be used in combination to place a user in a similar group. Feedback can be used to set an individual characteristic for a contextual variable or semantic value that is used to find similarities. Actions taken or settings used by the similar group can be used to select an automated setting value.

The technology can also use reinforcement learning, which trains the machine to make specific decisions, such as select an automation setting value. In reinforcement learning, the machine trains itself using trial and error using historical data. The machine can learn how to incorporate user feedback, which should act as a strong signal, to make a decision.

The technology described herein works with both individual automation preferences and group automation preferences. A group preference is uniquely calculated to address preferences for a group comprising two or more members. The group preference can be calculated using individual preferences as an input and/or through direct observation of automation settings and context when a group of people is together. The group preference can be an average of individual preferences when the automation setting is suitable for averaging. For example, a room temperature group preference for a meeting could be the average of individual temperature setting preferences for their home or offices. On the other hand, favorite food type for an automated lunch or snack order is not suitable for averaging.

As an alternative to averaging, a highest cumulative rank from individual settings can be selected. For example, in the food-ordering context, each individual's food preferences could be ranked (e.g., 1. Italian, 2. Mexican, 3. Chinese, 4. Indian, . . . ). The combined rankings could be used to calculate a group preference. For example, the cumulative rank for Italian food could be 1+4+2+3+1=11 for a five-member group where the group members rank Italian food as first, fourth, second, third, and first, respectively. The rankings for individual users can be derived from eating events. Similar scores could be calculated for other food genres and the lowest score (signifying the highest cumulative rank) selected. As a variation, the ranks for each user could be weighted based on one or more criteria. Criterion can include pickiness, job position, food variation, and such. For example, a food pickiness weighting could increase the weight given to a preference of a picky user.

At step 750, a control signal to implement the primary preference value as the automated setting value is output.

Figure 8:
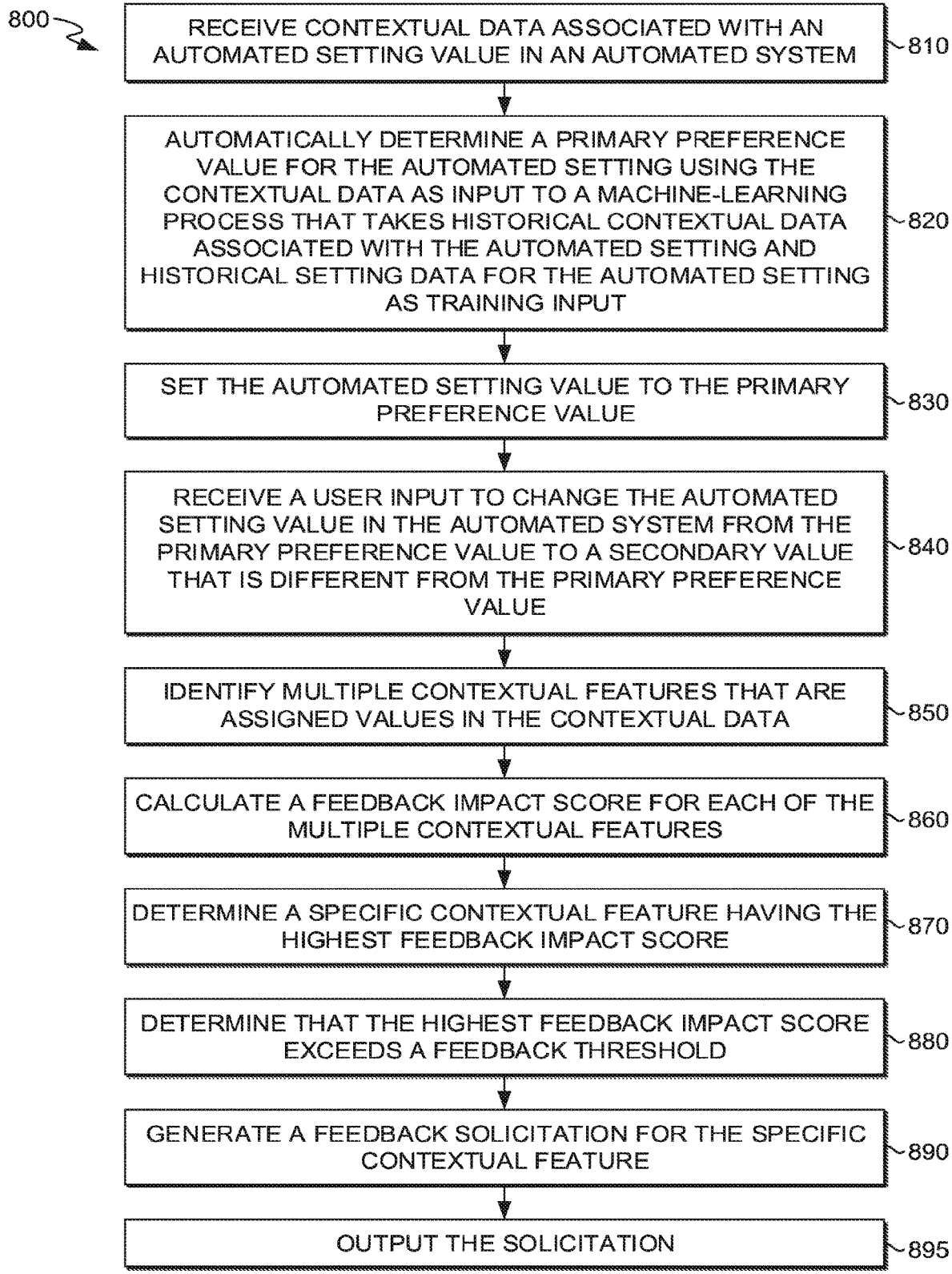

Turning now to FIG. 8, a method 800 for determining an automation setting preference is provided, according to an aspect of the technology described herein.

At step 810, contextual data associated with an automated setting value in an automated system is received. An automation system has been described previously, but in brief, it uses machine learning to select an automated setting value for an automated control. An automated control is any feature of the system capable of control by the automation system. The automation system can be integrated with the control system or may be a separate entity that communicates with the automation control system. For example, the automation system could reside in a server farm or on a client device and control a home entertainment system.

The contextual data can be provided periodically for reevaluation of the automation setting value, for example, contextual data can be provided every 30 minutes. Alternatively, the contextual data can be provided in response to a trigger, such as a change in contextual data. Another trigger is detection of an event that will be impacted by one or more controls controllable by the automation system. For example, scheduling a meeting in a conference room may trigger providing contextual information about the meeting so that audio, visual, and hospitality controls can be selected.

The contextual data comprises contextual features and associated values. For example, a contextual feature could be room temperature and the associated contextual value could be 72° F. The contextual data can vary from situation to situation and time to time. In some cases, contextual data is not known for one or more contextual features. Contextual data provided in any instance can be for the features where data is available.

At step 820, a primary preference value for the automated setting is automatically determined using the contextual data as input to a machine-learning process. The primary preference value is the value the machine-learning process most closely associates with the present context. The machine-learning process can take historical contextual data associated with the automated setting and historical setting data for the automated setting as training input.

Use of different machine-learning processes are possible in different aspects, including supervised learning processes (e.g., decision tree, random forest, logistic regression), unsupervised learning (e.g., apriori algorithm, K-means), or reinforcement learning. In each case, the contextual data is an input used to determine the appropriate primary preference value in the given context. The term primary preference means the most likely value for the given context. A given context can be associated with different values, though typically with different confidence factors or other measure of fit. The primary preference is associated with the highest confidence factor or other measure of fit to the context.

Each of these machine-learning methods also uses historical contextual data and associated automated setting values to determine the desired setting in the present. This data can be collected as automated setting event data, as described previously. The different types of a machine-learning processes can use the historical data differently.

The supervised learning processes use the historical contextual data as independent variables and the associated automated setting observation as the dependent variable. The historical data is used to train a function (different supervised learning processes can use different functions) to map to the contextual data to the output. In this way, the function should predict the desired outcome (i.e., automated setting) given a similar contextual data as input.

The contextual data is preprocessed to fit a schema that can be used to input data to the function during both training and use. The schema can include fields for the input of explicit user feedback. The field can take multiple forms, but in one aspect, the field provides an indication of a correlation between a specific contextual feature value and an automated setting value. For example, the field could indicate that recent exercise is correlated to turning the ceiling fan on.

The unsupervised learning method generally attempts to cluster people or objects based on similar characteristics. This may be suitable for finding some automated settings, for example, a common interest in entertainment, food preference, etc. The group characteristics (e.g., enjoys action movies) can then be used to recommend an action movie that the user has not yet seen. The unsupervised learning uses contextual data to classify the user at a point in time as similar to others in a similar context. In addition to contextual data, anything else known about the user (e.g., semantic data) can be used in combination to place a user in a similar group. Feedback can be used to set an individual characteristic for a contextual variable or semantic value that is used to find similarities. Actions taken or settings used by the similar group can be used to select an automated setting value.

The technology can also use reinforcement learning, which trains the machine to make specific decisions, such as select an automation setting value. In reinforcement learning, the machine trains itself using trial and error using historical data. The machine can learn how to incorporate user feedback, which should act as a strong signal, to make a decision.

At step 830, the automated setting value is set to the primary preference value.

At step 840, a user input is received to change the automated setting value in the automated system from the primary preference value to a secondary value that is different from the primary preference value. The user changing the automated setting suggests that the primary preference was not the correct value for the context. (The change could also represent signal noise since many use patterns are not entirely consistent.) Either way, feedback can help the system decide whether the user changing the setting represents an error in selection or just random variation in user preferences.

At step 850, multiple contextual features that are assigned values in the contextual data are identified. As mentioned, data for many contextual features may be available at any given time. Other contextual features may not have data available. At step 850, contextual features associated with a value are selected for further analysis.

At step 860, a feedback impact score for each of the multiple contextual features is calculated. Multiple methods of calculating the feedback impact score are possible including heuristic and simulation. A heuristic method uses a series of rules to assign an impact score. For example, points can be assigned for frequency of appearance within contextual data. A contextual feature that does not typically have associated data for a user (or in general) may be given a high score because understanding the association of this contextual data with and automation setting can significantly improve the operation of the machine-learning process.

In another aspect, a simulation is performed using hypothetical feedback that associates a contextual feature with the secondary value. In one simulation, the machine-learning process used to select the primary preference value is rerun using the feedback. The impact score can be a difference between an original confidence factor associated with the primary preference value without the feedback and the new confidence factor associated with the primary preference value. It should be noted that both a positive and negative response to feedback can be simulated.

In another aspect, a simulation is performed using hypothetical feedback received associating a contextual feature with the secondary value. In one simulation, the machine-learning process used to select the primary preference value is rerun using the feedback. The impact score can be a difference between an original confidence factor associated with the primary preference value without the feedback and the new confidence factor associated with the primary preference value. It should be noted that both a positive and negative response to feedback can be simulated.

In one aspect, the simulation may require retraining a machine-learning process using the feedback and then calculating a new confidence score given the original contextual information. The original machine-learning model can be preserved and only a temporary copy is retrained.

At step 870, a specific contextual feature having the highest feedback impact score is determined. As mentioned, an impact score can be calculated for each contextual feature associated with a value within the contextual data. The contextual feature associated with the highest impact score can be selected.

At step 880, the highest feedback impact score is determined to exceed a feedback threshold. Once the high score is identified, they can be compared with a threshold. The threshold can prevent seeking feedback that only results in relatively small improvements to the machine-learning process. As mentioned, users have only a limited amount of time to respond to feedback and it is important to use those opportunities sparingly. If the feedback impact score does not satisfy the threshold, then no further action may be taken. Alternatively, when the threshold is satisfied feedback can be solicited.

At step 890, a feedback solicitation for the specific contextual feature is generated. FIGS. 3 and 5 both provide exemplary feedback solicitations. In general, the feedback solicitation can be built using a feedback template. The feedback template can include a placeholder to describe the contextual feature, the contextual value associated with the contextual feature, and an automation setting value. The automation setting value can be the primary preference, the secondary preference, or some other value of interest. The template can ask the user whether the automated setting, such as the secondary preference, was selected because the contextual feature was associated with the contextual value.

At step 895, the solicitation for feedback is output. The solicitation feedback can be an audio solicitation or a visual solicitation. In one aspect, feedback is received and used to update the machine-learning process.

Exemplary Operating Environment

Figure 9:
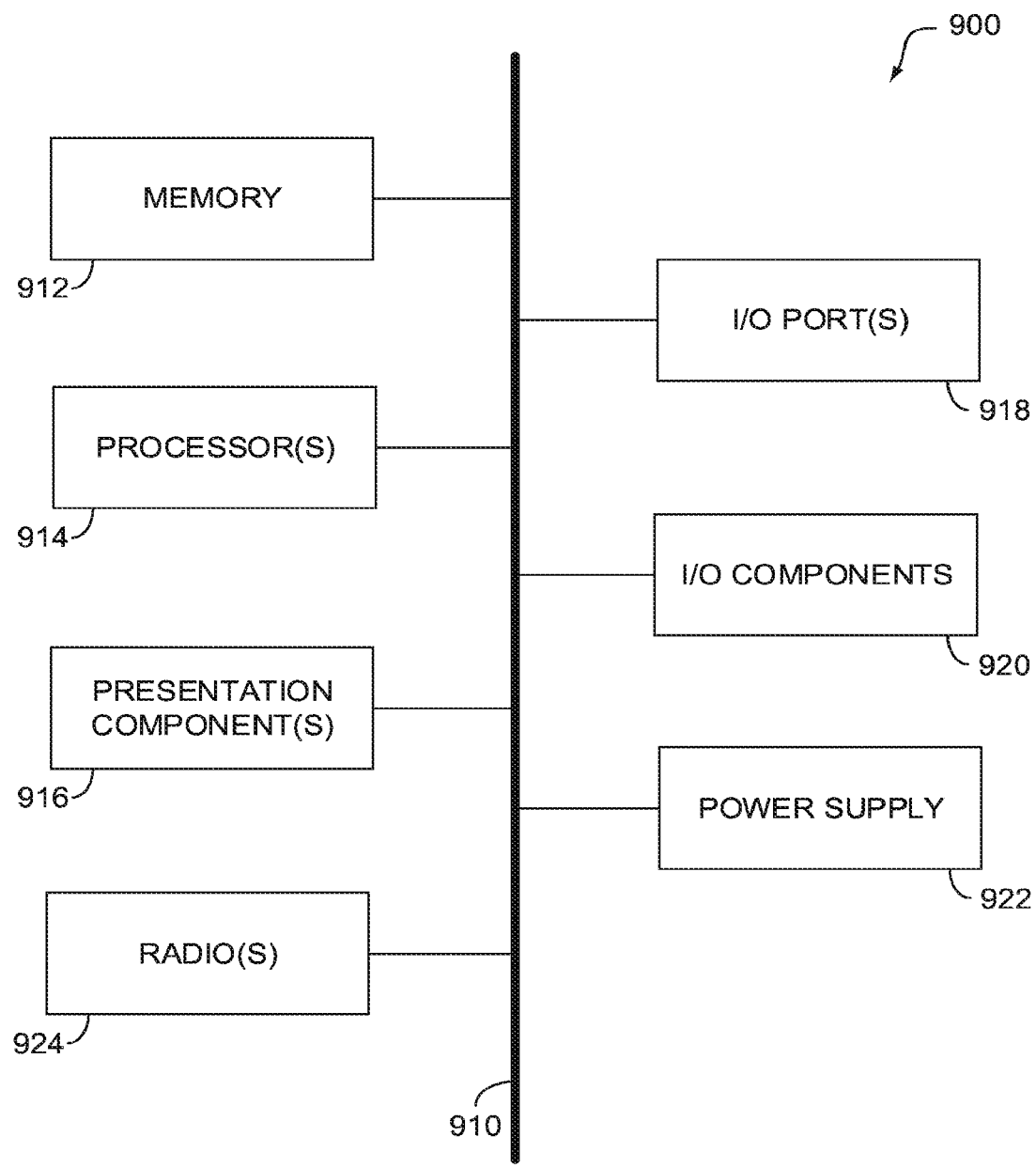
FIG. 9 is a block diagram of an exemplary computing environment suitable for use in implementing an aspect of the technology described herein.

Referring to the drawings in general, and to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including data center based servers, handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O ports 918 allow computing device 900 to be logically coupled to other devices, including I/O components 920, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the useable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 900. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include a radio 924. The radio 924 transmits and receives radio communications. The computing device may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of determining an automation setting preference comprising:
   receiving contextual data associated with an automated setting value in an automated system;
   automatically determining a primary preference value for the automated setting using the contextual data as input to a machine-learning process;
   setting the automated setting value to the primary preference value;
   receiving a user input to change the automated setting value in the automated system from the primary preference value to a secondary value that is different from the primary preference value;
   identifying a contextual feature value in the contextual data;
   calculating a feedback impact score for the contextual feature, the feedback impact score measuring a change in score associated with one or more preference values for the automated setting that would result from being able to establish a relationship between the secondary value and the contextual feature value;
   determining that the feedback impact score exceeds a feedback threshold;
   generating a feedback solicitation; and
   outputting the solicitation.

2. The method of claim 1, further comprising receiving feedback from the user.

3. The method of claim 2, further comprising retraining the machine-learning process using the feedback as training data that links a secondary preference for the automation setting to the contextual factor.

4. The method of claim 1, wherein the contextual feature is identified because an inclusion of the contextual feature in the contextual data occurs in less than 25% of contextual data sets.

5. The method of claim 1, wherein the contextual feature is identified because a value associated with the contextual feature differs from a value most commonly associated with the contextual feature.

6. The method of claim 1, wherein calculating the feedback impact score comprises simulating a retraining of the machine-learning process with both affirmative and negative feedback and measuring a change in a score associating the contextual data with the primary preference.

7. The method of claim 1, wherein the feedback solicitation is built using the contextual feature, a value for the contextual feature, and the secondary preference.

8. A computer-storage media having computer-executable instructions embodied thereon that when executed by a computer processor causes a mobile computing device to perform a method of determining an automation setting preference comprising:
   receiving contextual data associated with an automated setting value in an automated system;
   automatically determining a primary preference value for the automated setting using the contextual data as input to a machine-learning process;
   setting the automated setting value to the primary preference value;
   receiving a user input to change the automated setting value in the automated system from the primary preference value to a secondary value that is different from the primary preference value;
   identifying a contextual feature value in the contextual data;
   calculating a feedback impact score for the contextual feature, the feedback impact score measuring a change in score associated with one or more preference values for the automated setting that would result from being able to establish a relationship between the secondary value and the contextual feature value;
   determining that the feedback impact score exceeds a feedback threshold;
   generating a feedback solicitation; and
   outputting the solicitation.

9. The media of claim 8, further comprising receiving feedback from the user.

10. The media of claim 9, further comprising retraining the machine-learning process using the feedback as training data that links a secondary preference for the automation setting to the contextual factor.

11. The media of claim 8, wherein the contextual feature is identified because an inclusion of the contextual feature in the contextual data occurs in less than 25% of contextual data sets.

12. The media of claim 8, wherein the contextual feature is identified because a value associated with the contextual feature differs from a value most commonly associated with the contextual feature.

13. The media of claim 8, wherein calculating the feedback impact score comprises simulating a retraining of the machine-learning process with both affirmative and negative feedback.

14. The media of claim 13, wherein calculating the feedback impact score comprises measuring a change in a score associating the contextual data with the primary preference.

15. The media of claim 8, wherein the feedback solicitation is built using the contextual feature, a value for the contextual feature, and the secondary preference.

16. A computer-storage media having computer-executable instructions embodied thereon that when executed by a computer processor causes a mobile computing device to perform a method of determining an automation setting preference, the method comprising:

receiving contextual data associated with an automated setting value in an automated system;

automatically determining a primary preference value for the automated setting using the contextual data as input to a machine-learning process that takes historical contextual data associated with the automated setting and historical setting data for the automated setting as training input;

setting the automated setting value to the primary preference value;

receiving a user input to change the automated setting value in the automated system from the primary preference value to a secondary value that is different from the primary preference value;

identifying multiple contextual features that are assigned values in the contextual data;

calculating a feedback impact score for each of the multiple contextual features;

determining a specific contextual feature having the highest feedback impact score;

determining that the highest feedback impact score exceeds a feedback threshold;

generating a feedback solicitation for the specific contextual feature; and outputting the solicitation.

17. The media of claim 16, wherein the feedback impact score measuring a change in score associated with one or more preference values for the automated setting that would result from being able to establish a relationship between the secondary value and the contextual feature value.

18. The media of claim 16, wherein calculating the feedback impact score comprises simulating a retraining of the machine-learning process with both affirmative and negative feedback.

19. The media of claim 16, wherein the feedback solicitation is built using the specific contextual feature, a value for the specific contextual feature, and the secondary value.

20. The media of claim 16, wherein the method further comprises receiving user feedback and retraining the machine-learning process using the user feedback.

* * * * *